US011188836B2

(12) United States Patent
Basiri et al.

(10) Patent No.: US 11,188,836 B2
(45) Date of Patent: Nov. 30, 2021

(54) METHOD AND SYSTEM FOR PROCESSING MULTI-REQUEST APPLICATIONS

(71) Applicant: APPLYBOARD INC., Kitchener (CA)

(72) Inventors: Martin Basiri, Kitchener (CA); Seyedmohammad Naghibi, Kitchener (CA); Mahdi Basiri, Kitchener (CA); Masih Basiri, Kitchener (CA)

(73) Assignee: APPLYBOARD INC., Kitchener (CA)

( * ) Notice: Subject to any disclaimer, the term of this patent is extended or adjusted under 35 U.S.C. 154(b) by 908 days.

(21) Appl. No.: 15/907,650

(22) Filed: Feb. 28, 2018

(65) Prior Publication Data

US 2019/0266500 A1 Aug. 29, 2019

(51) Int. Cl.
*G06N 5/04* (2006.01)
*G06N 20/00* (2019.01)
*G06N 7/00* (2006.01)

(52) U.S. Cl.
CPC .............. *G06N 5/04* (2013.01); *G06N 7/005* (2013.01); *G06N 20/00* (2019.01)

(58) Field of Classification Search
CPC .......... G06N 5/04; G06N 7/005; G06N 20/00; G06N 5/02; G06N 5/00; G06N 20/10;
(Continued)

(56) References Cited

U.S. PATENT DOCUMENTS

| 7,478,064 B1 * | 1/2009 | Nacht | G06Q 40/00 |
| | | | 705/35 |
| 2002/0103749 A1 * | 8/2002 | Agudo | G06Q 20/10 |
| | | | 705/38 |

(Continued)

OTHER PUBLICATIONS

McNamara et al., "Natural language processing in an intelligent writing strategy tutoring system", Oct. 6, 2012 https://link.springer.com/article/10.3758/s13428-012-0258-1 (Year: 2012).*

(Continued)

*Primary Examiner* — Kamran Afshar
*Assistant Examiner* — Shoun J Abraham
(74) *Attorney, Agent, or Firm* — Bereskin & Parr LLP/S.E.N.C.R.L., s.r.l.

(57) ABSTRACT

A system receives application data to be used in requests made on behalf of an applicant to a selection of evaluator devices. The system includes a predictive model which predicts actual eligibility criteria for acceptance of a request by the evaluator devices, and is trained with a library of application data including previously evaluated requests and outcomes to the previously evaluated requests. The system compiles the application data into separate requests by synchronizing the application data and identifying a common core of data required by each selected evaluator device and compiling the common core of data along with particular requirements of individual evaluator devices. An applicant can thereby complete a multi-request application which generates requests to a plurality of evaluator devices and which avoids duplication of data storage and data transmission, and reduces effort required by the applicant. Implementations include students making applications for admission to academic institutions.

16 Claims, 11 Drawing Sheets

(58) Field of Classification Search
CPC ........ G06N 20/20; G06N 7/00; G06Q 50/205; G06Q 50/20; G06Q 50/2053; G06Q 50/2057
See application file for complete search history.

(56) References Cited

U.S. PATENT DOCUMENTS

| | | | |
|---|---|---|---|
| 2006/0265258 A1* | 11/2006 | Powell | G06Q 30/02 705/327 |
| 2009/0313200 A1* | 12/2009 | Petrucelli | G06Q 50/26 706/47 |
| 2014/0011180 A1* | 1/2014 | Tomaziefski | G09B 5/00 434/362 |
| 2014/0279643 A1* | 9/2014 | Ye | G06Q 10/10 705/327 |
| 2015/0006423 A1 | 1/2015 | Ma et al. | |
| 2015/0006424 A1* | 1/2015 | Ma | G06Q 50/2053 705/327 |
| 2015/0050631 A1* | 2/2015 | Reynaldo | G09B 5/06 434/308 |
| 2015/0066559 A1* | 3/2015 | Brouwer | G06Q 50/2053 705/7.21 |
| 2016/0163009 A1* | 6/2016 | Saedy | G06Q 50/2053 705/327 |

OTHER PUBLICATIONS

CIPO, Examination Report, dated Jan. 4, 2019, re Canadian Patent Application No. 2996928.

* cited by examiner

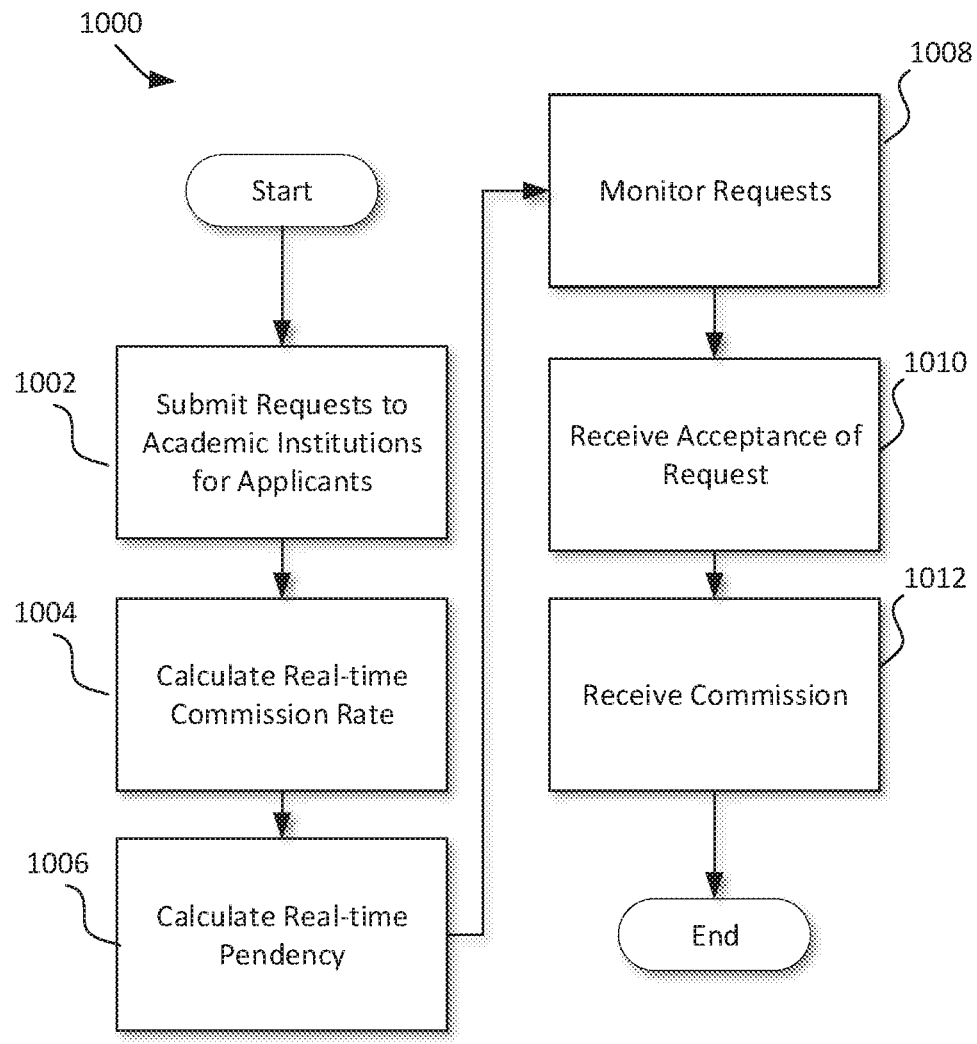
Fig. 10: Description: Agent method flowchart

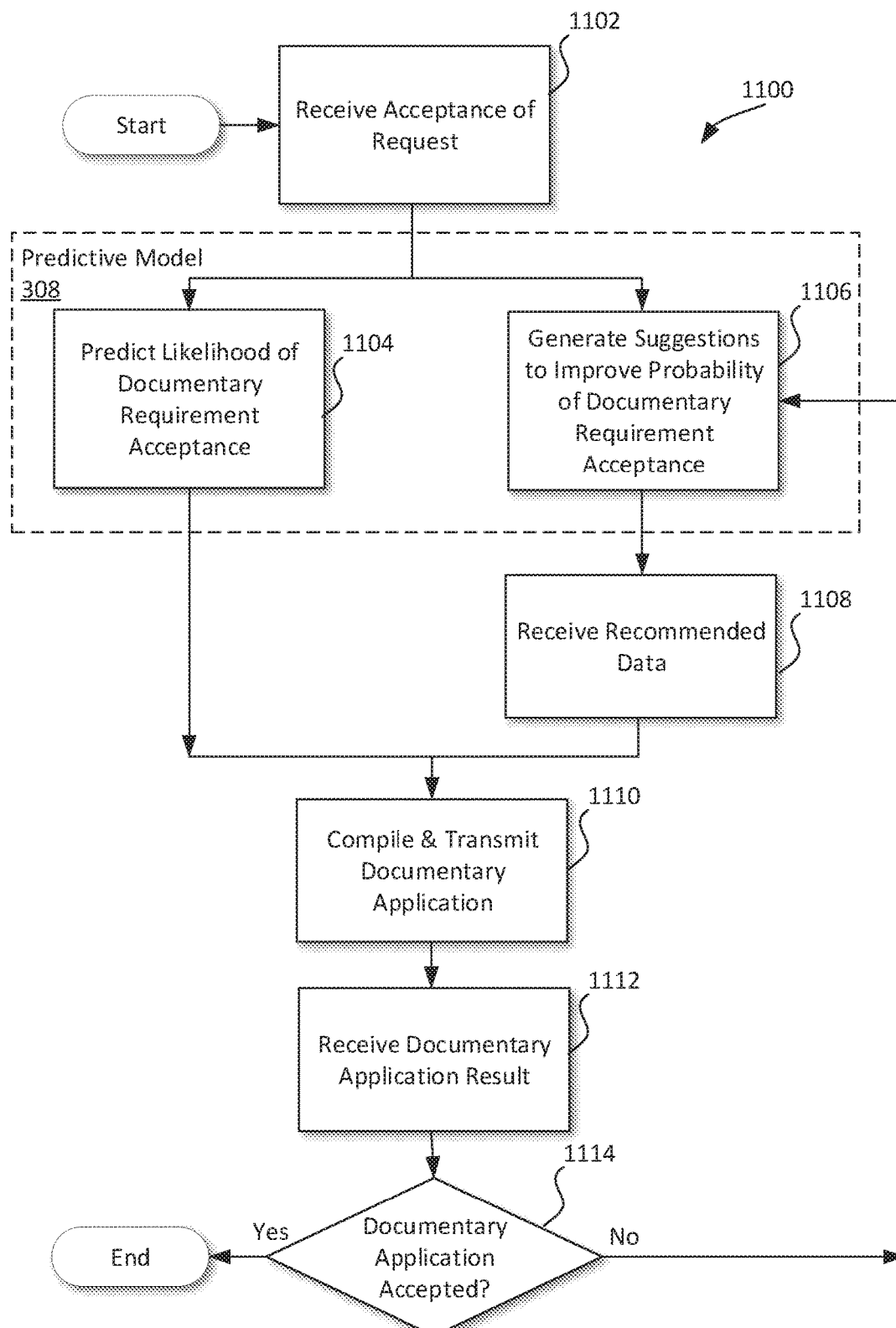
Fig. 11: Description: Visa application flowchart

METHOD AND SYSTEM FOR PROCESSING MULTI-REQUEST APPLICATIONS

FIELD

The present disclosure relates generally to the collection, synchronization, and processing of digital information.

BACKGROUND

Collecting and compiling digital information into requests for analysis by a multitude of receiving systems can be inefficient and problematic. Each receiving system may have its own particular criteria for evaluating requests, and the same data must often be duplicated or synchronized for inclusion into several separate requests to separate receiving systems.

Several industries use computerized application processes where applicants collect and compile data into requests to be evaluated by a multitude of receiving systems. These receiving systems typically receive requests through computer systems, which may be referred to as evaluator devices. In many of these industries, an applicant is faced with the technical challenges associated with compiling, organizing, and synchronizing data into separate requests. Examples include government institutions, where an individual may make applications to achieve certain bureaucratic functions. Another example includes academic institutions, where a prospective student may submit several applications for admission into several different academic institutions.

In such industries, the challenges faced by applicants are often further compounded by uncertainty in the application process. In the example of academic institutions, an applicant may make a request for admission to an academic institution, uncertain as to one's likelihood of admission, and spend a great deal of time waiting for a reply, only to receive a follow-up request from the academic institution for additional data, such as additional documentary requirements, which could not have been reasonably anticipated based on the institution's originally stipulated admission criteria. Extending this circumstance to several academic institutions only compounds the challenges.

SUMMARY

According to an aspect of the disclosure, a system for processing a multi-request application is provided. The system includes an applicant device configured to obtain application data to be used in requests made on behalf of an applicant to a selection of evaluator devices, wherein the application data comprises preliminary eligibility data, and wherein at least one evaluator device of the selection of evaluator devices has stipulated acceptance criteria against which the preliminary eligibility data is notionally compared to determine acceptance or denial of a request made to the evaluator device. The system further includes a multi-request compiling server having a network interface in communication with the selection of evaluator devices and the applicant device via a computer network, a memory for storing programming instructions and a library of application data, and a processor in communication with the network interface and the memory. The processor is configured to receive the application data and the selection of evaluator devices from the applicant device, predict actual eligibility criteria for acceptance of a request by at least one of the evaluator devices of the selection of evaluator devices by inputting the preliminary eligibility data into a predictive model trained with the library of application data to predict actual eligibility criteria required by evaluator devices to accept requests, the library of application data including previously evaluated requests and outcomes to said previously evaluated requests, request and receive supplementary data from the applicant device required to fulfill the actual eligibility criteria for the at least one evaluator device of the selection of evaluator devices through a universal input form, and compile the preliminary eligibility data and supplementary data into separate requests for the least one evaluator device of the selection of evaluator devices according to the actual eligibility criteria of the evaluator device.

The processor may further be configured to receive a preliminary selection of evaluator devices from the applicant device, generate probabilities of acceptance of requests from the applicant device to at least one evaluator device of the preliminary selection of evaluator devices by inputting the preliminary eligibility data into the predictive model, and output the probabilities to the applicant device.

The processor may further be configured to receive the selection of evaluator devices by outputting a pool of likely-accepting evaluator devices to the applicant device, the pool of likely-accepting evaluator devices comprising evaluator devices of the preliminary selection of evaluator devices having probabilities of acceptance beyond a probability threshold, and receiving the selection of evaluator devices as a selection of evaluator devices from the pool of likely-accepting evaluator devices.

One of the preliminary eligibility data and the supplementary data may include a written sample, and the processor may be further configured to apply natural language processing techniques in conjunction with the predictive model to predict quality of the written sample with respect to obtaining acceptance of a request.

The processor may further be configured to normalize the preliminary eligibility data according to eligibility evaluation requirements of at least one evaluator device of the selection of evaluator devices to compile the preliminary eligibility data into the separate requests.

The system may further include a monitoring device in communication with the applicant device, the selection of evaluator devices, and the multi-request compiling server via the computer network, and wherein the monitoring device is configured to display statuses of requests from a plurality of applicant devices to a plurality of respective selections of evaluator devices.

The monitoring device may be further configured to determine and to display an expected pendency duration of a request by an application device of the plurality of applicant devices to an evaluator device of the plurality of respective selections of evaluator devices.

The monitoring device may be further configured to determine and to display an expected commission rate to be obtained upon acceptance of a request by an application device of the plurality of applicant devices to an evaluator device of the plurality of respective selections of evaluator devices.

According to another aspect of the disclosure, a method for compiling a request from a multi-request application is provided. The method involves receiving application data and a selection of evaluator devices from an applicant device, wherein the application data comprises preliminary eligibility data, and wherein at least one evaluator device of the selection of evaluator devices has stipulated acceptance criteria against which the preliminary eligibility data is notionally compared to determine acceptance or denial of a request made to the evaluator device, predicting actual eligibility criteria for acceptance of a request by the at least one of the evaluator devices of the selection of evaluator devices by inputting the preliminary eligibility data into a predictive model trained with a library of application data to predict actual eligibility criteria required by evaluator devices to accept requests, the library of application data including previously evaluated requests and outcomes to said previously evaluated requests, requesting and receiving supplementary data from the applicant device required to fulfill the actual eligibility criteria for the at least one evaluator device of the selection of evaluator devices through a universal input form, and compiling the preliminary eligibility data and supplementary data into separate requests for at least one of the evaluator devices of the selection of evaluator devices according to the actual eligibility criteria of the evaluator device.

The method may involve receiving a preliminary selection of evaluator devices from the applicant device, generating probabilities of acceptance of requests from the applicant device to at least one evaluator device of the preliminary selection of evaluator devices by inputting the preliminary eligibility data into the predictive model, and outputting the probabilities to the applicant device.

Receiving the selection of evaluator devices may involve outputting a pool of likely-accepting evaluator devices to the applicant device, the pool of likely-accepting evaluator devices comprising evaluator devices of the preliminary selection of evaluator devices having probabilities of acceptance beyond a probability threshold, and receiving the selection of evaluator devices as a selection of evaluator devices from the pool of likely-accepting evaluator devices.

One of the preliminary eligibility data and the supplementary data may include a written sample, and the method further involve applying natural language processing techniques in conjunction with the predictive model to predict quality of the written sample with respect to obtaining acceptance of a request.

The method may involve normalizing the preliminary eligibility data according to eligibility evaluation requirements of at least one evaluator device of the selection of evaluator devices to compile the preliminary eligibility data into the separate requests.

The method may involve outputting statuses of requests from a plurality of applicant devices to a plurality of respective selections of evaluator devices to a monitoring device.

The method may involve determining an expected pendency duration of a request by an application device of the plurality of applicant devices to an evaluator device of the plurality of respective selections of evaluator devices, and displaying the expected pendency duration to the monitoring device.

The method may involve determining an expected commission rate to be obtain upon acceptance of a request by an application device of the plurality of applicant devices to an evaluator device of the plurality of respective selections of evaluator devices, and displaying the expected commission rate to the monitoring device.

Other features and advantages are described in greater detail below.

BRIEF DESCRIPTION OF THE DRAWINGS

Non-limiting embodiments of the present disclosure will now be described, by way of example only, with reference to the attached Figures, wherein:

FIG. 10 is a flowchart showing a method for processing admission requests for filing at academic institutions; and FIG. 11 is a flowchart showing a method for fulfilling a request for a documentary requirement.

DETAILED DESCRIPTION

Figure 1:
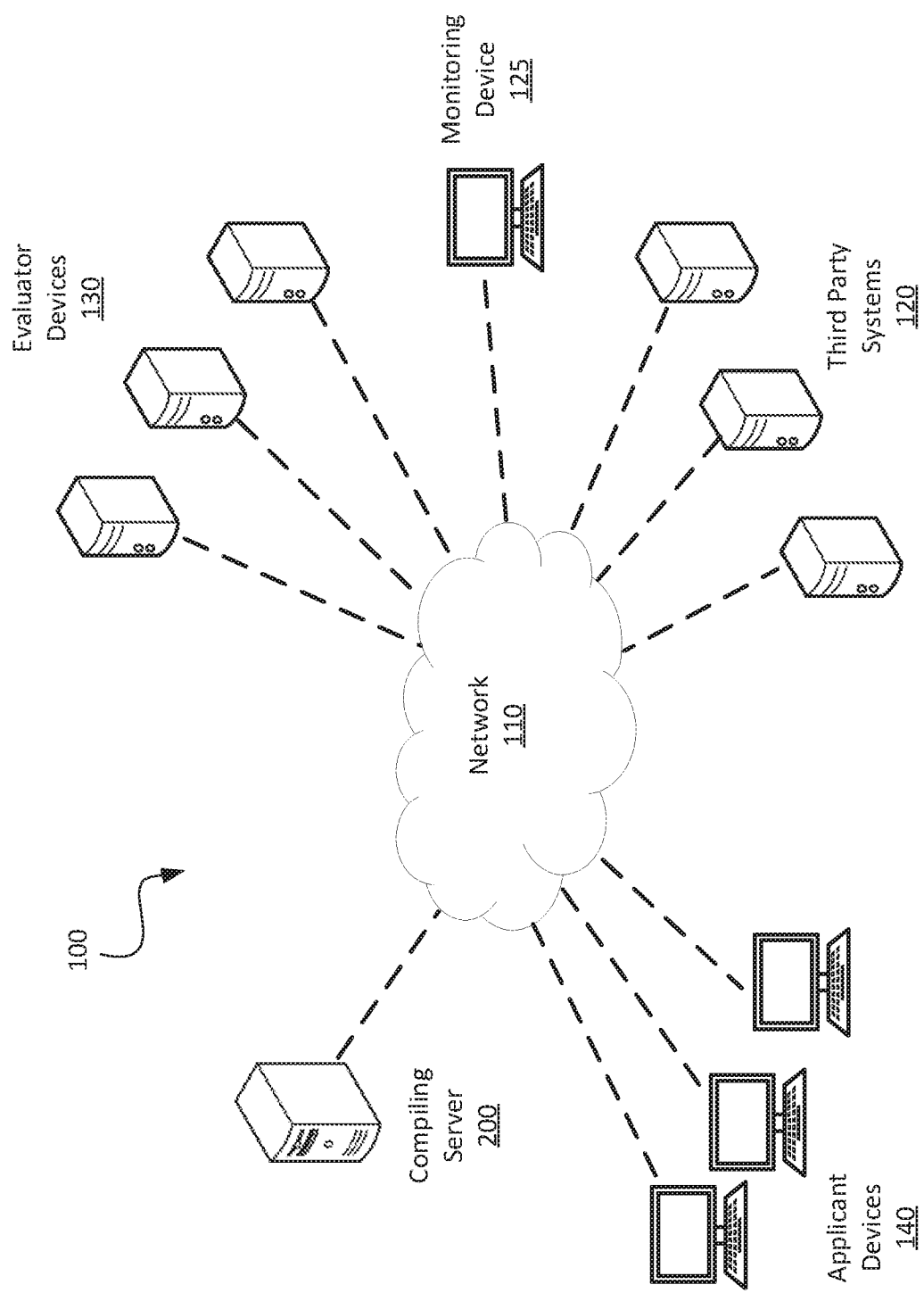
FIG. 1 is a schematic diagram of a system for processing a multi-request application, according to a non-limiting embodiment.

The present disclosure relates generally to the collection, synchronization, and processing of digital information. In one aspect, the present disclosure provides a system for compiling and synchronizing application data for a multitude of requests through a single application system. This system may be referred to as a system for processing a multi-request application. This system may be applied to many industries which use computerized application processes where applicants collect and compile data to be included in requests to be evaluated by evaluator devices, including the government and academic industries.

The system addresses several technical challenges faced by applicants making use of such computerized application processes. The system can compile and synchronize application data by identifying a common core of data required by each evaluator device, in addition to the particular requirements of each evaluator device, and thereby intelligently design a multi-request application which takes an application through an application process which avoids duplication of data storage, data transmission, and effort on the part of the applicant. The system can predict actual requirements for acceptance of a request by an evaluator device through predictive modelling and machine learning.

Thus, a prospective student, for example, making several applications for admission to several academic institutions, may complete a single multi-request application where all of the data and documentary requirements are collected for applications for admission to several academic institutions, from which the system can intelligently extract and compile the particular application requirements of each academic institution to evaluate requests for admission, and transmit the requests. The system can automatically conform the application data to the specific evaluation requirements of the academic institution by, for example, normalizing a student's grades for evaluation by an academic institution operating under a particular grading scheme. Further, the system may intelligently anticipate the application requirements using predictive modelling and machine learning, so that all necessary data can be gathered upfront. These predicted application requirements may be more accurate than the admission requirements stipulated by the academic institution. Moreover, the system may integrate with monitoring systems with which an agent can manage the applications of several prospective student clients, while leveraging the predictive capacity of the system to anticipate likelihood of admission, expected pendency of applications, and expected commission fees to be obtained by the agent.

Other features and advantages of the system are described in greater detail below, with reference to the non-limiting embodiments described in the attached Figures. Although the following embodiments generally describe a system for processing a multi-request application in the context of making applications to academic institutions, it is to be understood that the example embodiments provided do not limit the scope of the present disclosure, and that the system may be applied to other computerized application processes.

FIG. 1 is a schematic diagram of a system 100 for processing a multi-request application, according to a non-limiting embodiment. The system 100 includes applicant devices 140, evaluator devices 130, third party systems 120, a monitoring device 125, and a compiling server 200, in communication over one or more computer networks, indicated as network 110. The compiling server 200 handles requests to evaluator devices 130 on behalf of applicant devices 140 by establishing a streamlined application process through which an applicant device 140 can make several requests to several evaluator devices 130 through a single application process, as will be discussed in greater detail throughout the Figures below.

In the present embodiment, the compiling server 200, evaluator devices 130, and third party systems 120, each include a computing device running a server application with storage, communication, and processing means. Further, the applicant devices 140 and monitoring device 125 each include a computing device running a user application with storage, communication, and processing means. However, it is contemplated that in other embodiments, other computer systems may be used to implement the actors of system 100. For example, although a single compiling server 200 is described, it is understood that compiling server 200 may refer to a combination of computers and/or servers, such as in a cloud computing environment. As another example, in some embodiments, the applicant devices 140 and/or monitoring device 125 may include a desktop computer, a tablet computer, a laptop, or similar, or in other embodiments, a smart phone running an operating system such as, for example, Android®, iOS®, Windows® mobile, BB 10, or similar.

The system 100 can be implemented to assist prospective students making applications for admission to academic institutions. In such implementations, the evaluator devices 130 include computer systems of the academic institutions which administer and/or accept applications for admission through at least a partly computerized application process. Further, the monitoring device 125 includes a computer system used by an agent managing a set of prospective students' applications. Further, third party systems 120 include systems which facilitate the application process, including payment processors for processing the payment of application fees, government institutions which grant student visas to prospective students making applications from abroad, and other third parties.

In other implementations, evaluator devices 130 may include government offices evaluating various bureaucratic requests, employer systems considering applications for employment, or other institutions which employ an at least partly computerized evaluation process.

Figure 2:
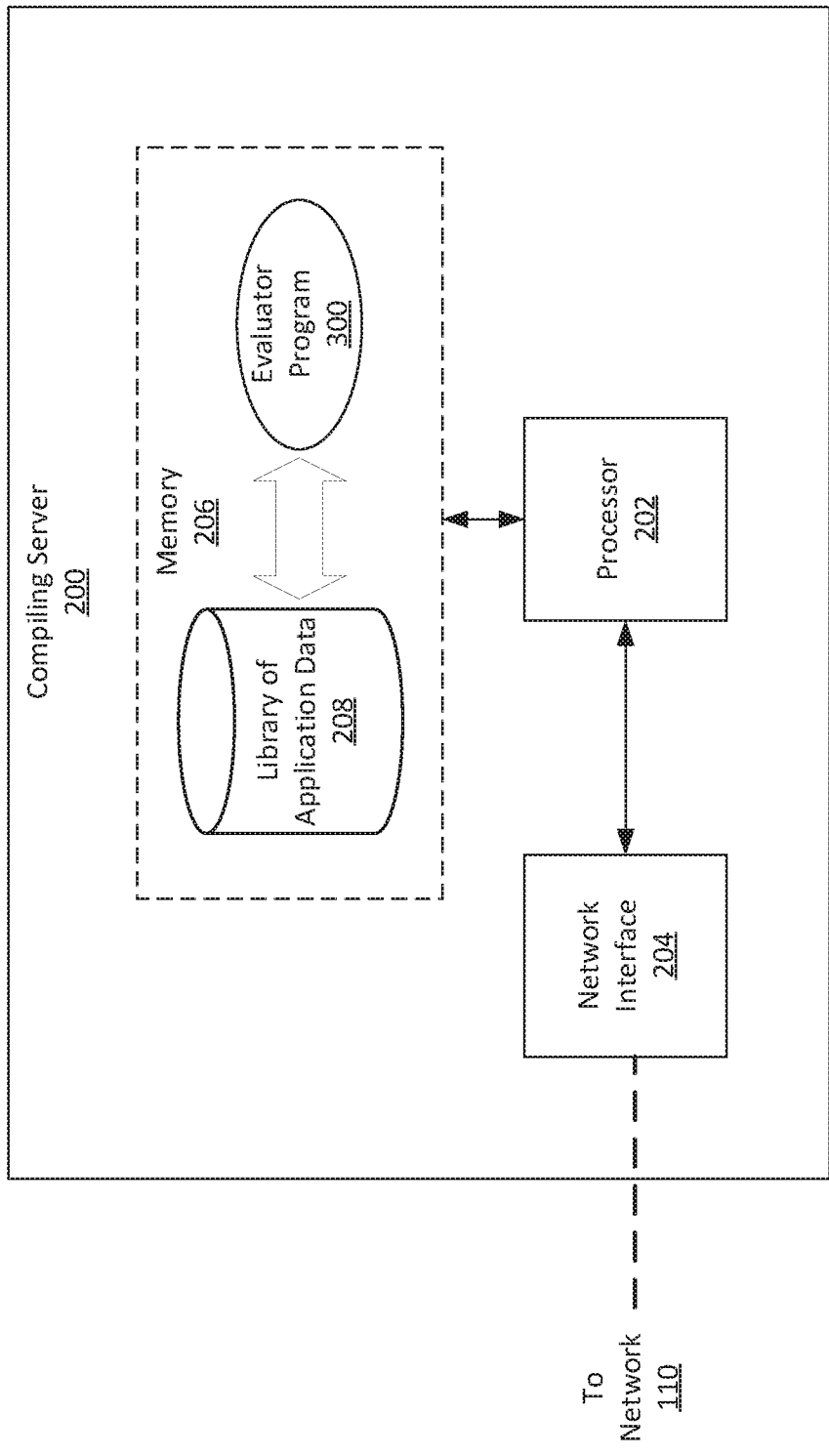
FIG. 2 is a block diagram showing the functional components of a compiling server of the system of FIG. 1.

FIG. 2 is a block diagram of functional components of compiling server 200, according to a non-limiting embodiment. Compiling server 200 includes a processor 202, a network interface 204, and a memory 206.

Although a single processor 202 is shown, the term "processor" as discussed herein refers to any quantity and combination of a processor, a central processing unit (CPU), a microprocessor, a microcontroller, a field-programmable gate array (FPGA), and similar.

The network interface 204 includes programming logic enabling the compiling server 200 to communicate over network 110, is configured for bidirectional data communications through the network 110, and accordingly can include a network adaptor and driver suitable for the type of network used.

The memory 206 can include volatile storage and non-volatile storage. Volatile storage may include random-access memory (RAM) or similar. Non-volatile storage may include a hard drive, flash memory, and similar. The memory 206 stores a library of application data, termed library 208, which includes application data provided by applicant devices 140 for making requests to evaluator device 130, and which also includes previous application data related to previous requests. The memory 206 further stores an evaluator program 300, which cooperates with library 208, and which includes programming instructions for implementing the functions and methods described herein.

Figure 3:
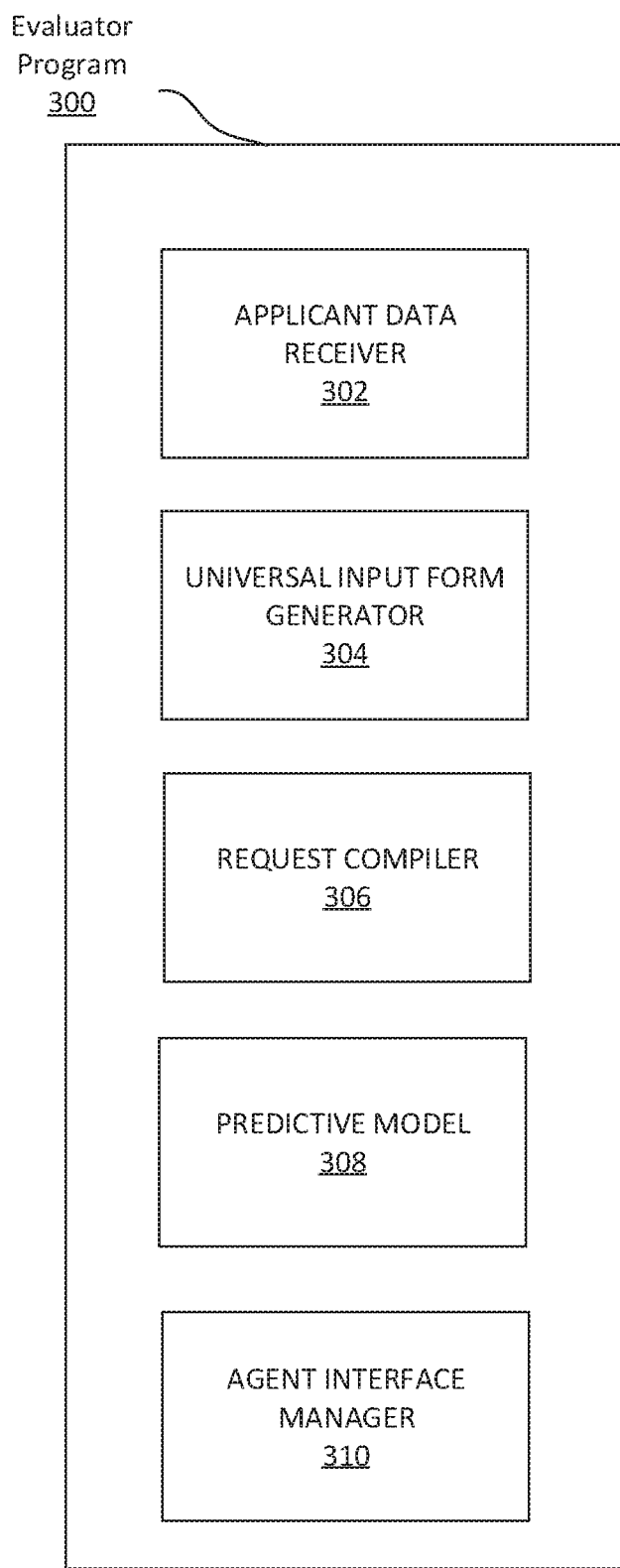
FIG. 3 is a block diagram showing the functional modules of an evaluator program running on the compiler server of FIG. 2.

FIG. 3 is a block diagram of the functional modules of evaluator program 300, according to a non-limiting embodiment. Broadly, the evaluator program 300 includes applicant data receiver 302, universal input form generator 304, request compiler 306, predictive model 308, and agent interface manager 310.

Applicant data receiver 302 is a program comprising programming instructions for receiving application data from applicant devices 140, e.g. through transmission over network 110. Application data can include preliminary eligibility data that is generally required for acceptance of requests to evaluator devices 130. The applicant data receiver 302 can also receive a selection of evaluator devices 130 to which requests may be sent, and supplementary data required by particular evaluator devices 130.

In the implementation of students making applications for admission to academic institutions, commonly required data may include grades and personal identifying information of the applicant. Such preliminary eligibility criteria is notionally compared against the stipulated eligibility of the academic institution to determine acceptance or denial of the request for admission.

Universal input form generator 304 is a program comprising programming instructions for generating a universal input form which enables an applicant to provide the applicant data for making requests to several evaluator devices 130 through a multi-request application, such as a universal input form. The universal input form generator 304 can identify a common core of data required by each evaluator device 130, in addition to the non-core requirements of each evaluator device 130, which may be referred to as supplementary data, and thereby design an application process which asks that an applicant provide each piece of data only once throughout the application process.

In the implementation of students making applications for admission to academic institutions, a common core of data may include grades, a resume, nationality, and personal identifying information. Some academic institutions, however, may have particular requirements for personal statements, essays, statements of purpose, selected courses, alternative program selections, or other particular application requirements. The prospective student need only complete a single multi-request application to provide the required data.

Request compiler 306 is a program comprising programming instructions for extracting, synchronizing, and compiling, the application data received through the universal input form, into requests compatible for submission to evaluator devices 130. The request compiler 306 compiles preliminary eligibility data and supplementary data into separate requests for evaluator devices 130 which were selected by the applicant, according to the acceptance criteria, whether stipulated or actual, of the particular evaluator device 130.

In the implementation of students making applications for admission to academic institutions, each request for admission to an academic institution may include the grades, nationality, and personal identifying information of the applicant. One request may include a person statement, another request may include an essay, and another request may include an alternative program selection particular to one academic institution.

Predictive model 308 is a predictive model comprising programming instructions for predicting actual requirements for acceptance of a request by an evaluator device 130 through predictive modelling and machine learning. These predictions may include expected likelihood of acceptance of the request, and anticipations of additional application requirements which are beyond the stipulated acceptance criteria stipulated by an evaluator device 130. By predicting actual requirements rather than relying on stipulated requirements, the predictive model 308 can cooperate with request compiler 306 to generate a universal input form which enables an applicant to provide the applicant data for making requests to several evaluator devices 130 through a single multi-request application.

The predictive model 308 may include a predictive model trained with the library 208 to predict actual eligibility criteria required by evaluator devices 130 to accept requests based on previously evaluated requests and outcomes to the previously evaluated requests.

In the implementation of students making applications for admission to academic institutions, the predictive model 308 can predict the likelihood of admission of an applicant to an academic institution based on the preliminary eligibility requirements such as the applicant's grades. The predictive model 308 can also predict whether the applicant may be required to submit additional supplementary data, such as a language requirement certificate, or a granted visa, which may not have been apparent rom the academic institution's stipulated eligibility criteria.

The agent interface manager 310 calculates the expected commission rate to be received by an agent managing a set of prospective students' applications if a request is accepted. A calculation may be made for each pending request being managed by the agent, and may be made in real-time. Each academic institution may put in place with the agent its own contracts for directing successful applicants to the academic institution, the terms of which are stored in agent interface manager 310.

Figure 4:
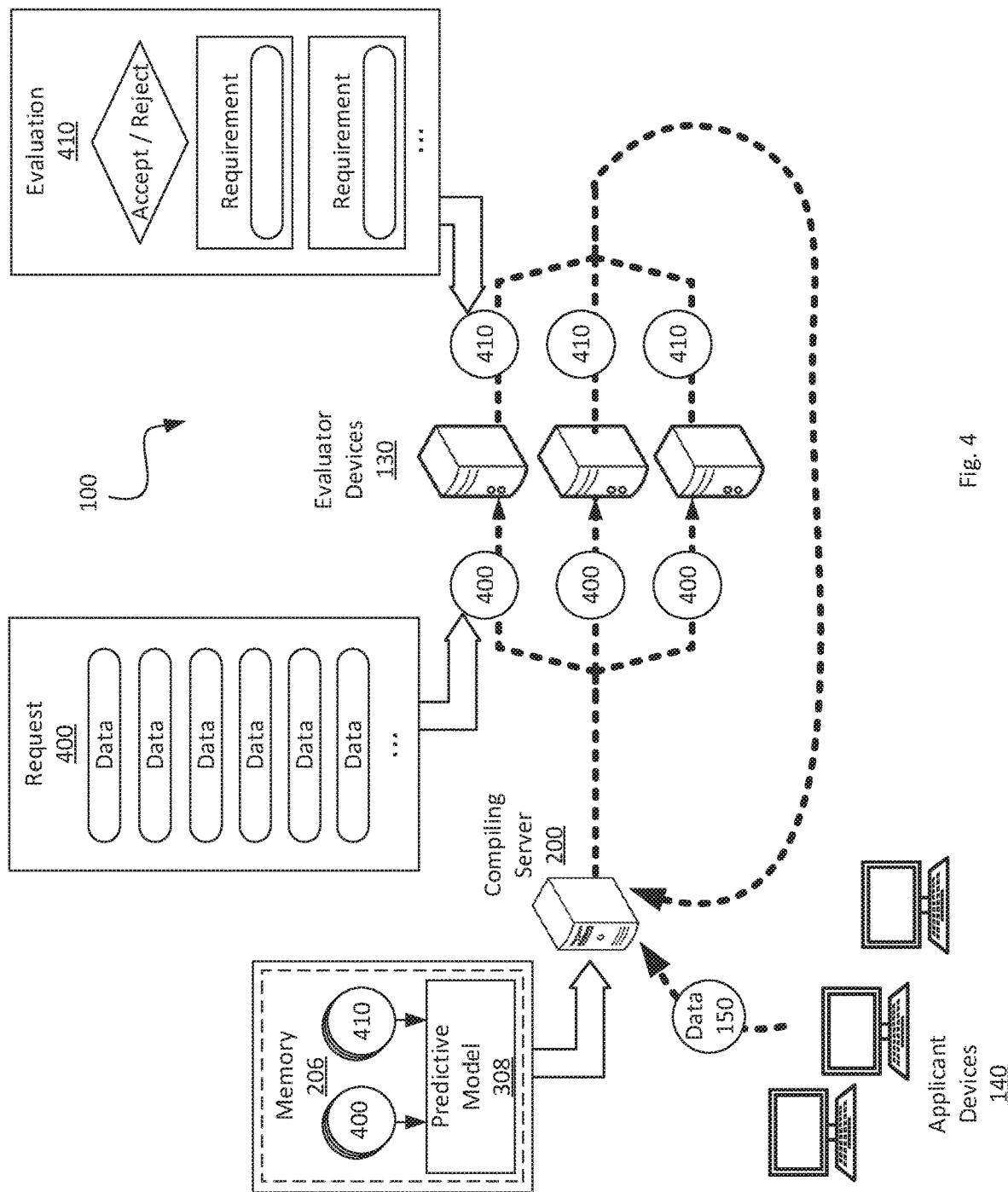
FIG. 4 is a schematic diagram of the system of FIG. 1 showing the training of a predictive model of the evaluator program of FIG. 3.
Figure 5:
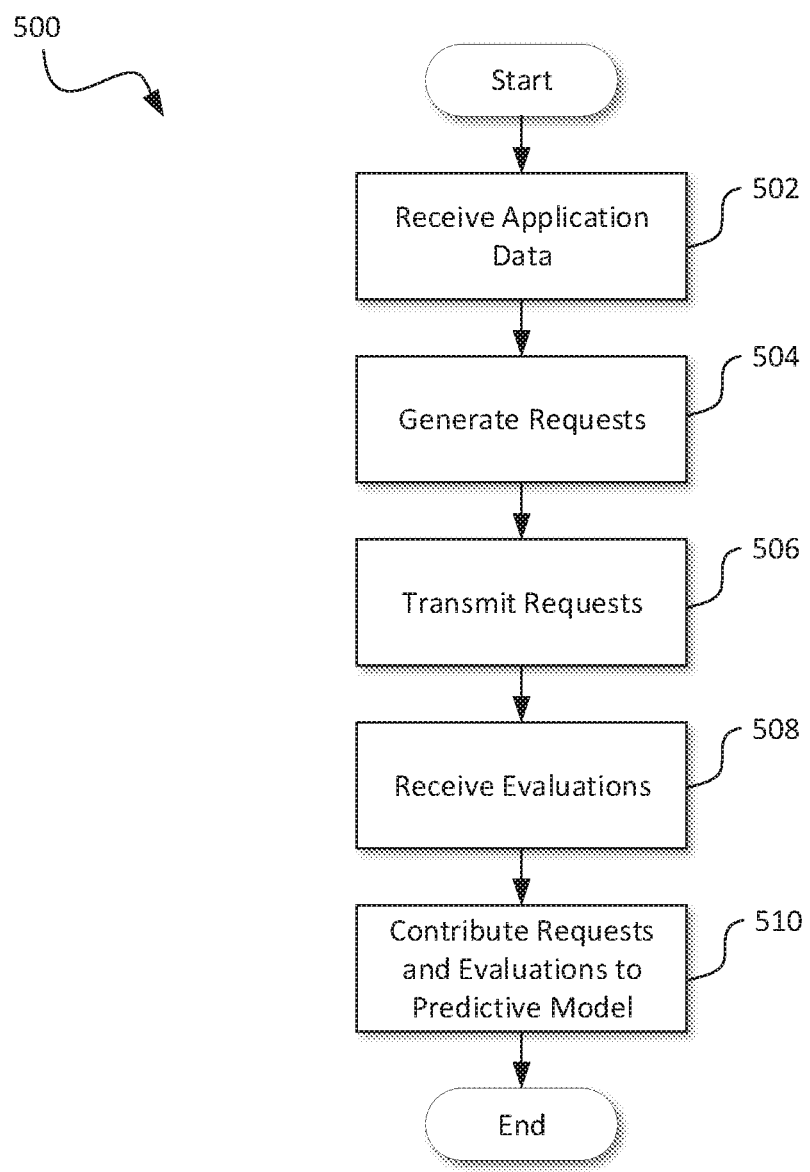
FIG. 5 is a flowchart showing a method for training the predictive model of the evaluator program of FIG. 3.

FIG. 4 is a schematic diagram of the system 100 showing the training of the predictive model 308, according to a non-limiting embodiment, with network 110, third party systems 120, and monitoring device 125 omitted for brevity. FIG. 5 is a flowchart showing a method 500 for training the predictive model 308, according to a non-limiting embodiment, which may be consulted with continued reference to FIG. 4. It is to be emphasized, however, that the blocks of method 500 need not be performed in the exact sequence as shown. Further, the method 500 is described as performed by a system and device discussed herein, but this is not limiting and the method can alternatively be performed by other systems and/or devices.

At block 502, the compiling server 200 receives application data 150. The applicant devices 140 transmit application data 150 to compiling server 200 as part of an application process, to be used in requests, which may or may not proceed through a multi-request application. The application data 150 may include data relating to previous applications to evaluator devices 130.

At block 504, the compiling server 200 generates requests 400 to evaluator devices 130. The compiling server 200 compiles the application data 150 into separate requests 400 for transmission to evaluator devices 130.

At block 506, the compiling server 200 transmits the requests 400 to the evaluator devices 130.

The evaluator devices 130 receive the requests 400. The evaluator devices 130 evaluate the requests, including determining acceptance or denial of the request, and in some cases, requests for additional requirements to be provided before acceptance or denial of the request is given. The evaluator devices 130 transmit the evaluations 410 to the compiling server 200.

At block 508, the compiling server 200 receives evaluations 410.

At block 510, the requests 400 and evaluations 410 are contributed toward library 208, and incorporated into predictive model 308, to train predictive model 308 to predict acceptance, denial, and follow-up requests for supplementary data, based on the requests 400 and evaluations 410.

In the implementation of students making applications for admission to academic institutions, the evaluator devices 130 include academic institutions, the requests 400 include requests for admissions to the academic institutions, and the evaluations 410 may include acceptance or denial of entrance into the academic institution, and may include follow-up requests for supplementary data such as a language requirement certificate, or a granted visa, which may not have been apparent rom the academic institution's stipulated eligibility criteria.

Figure 6:
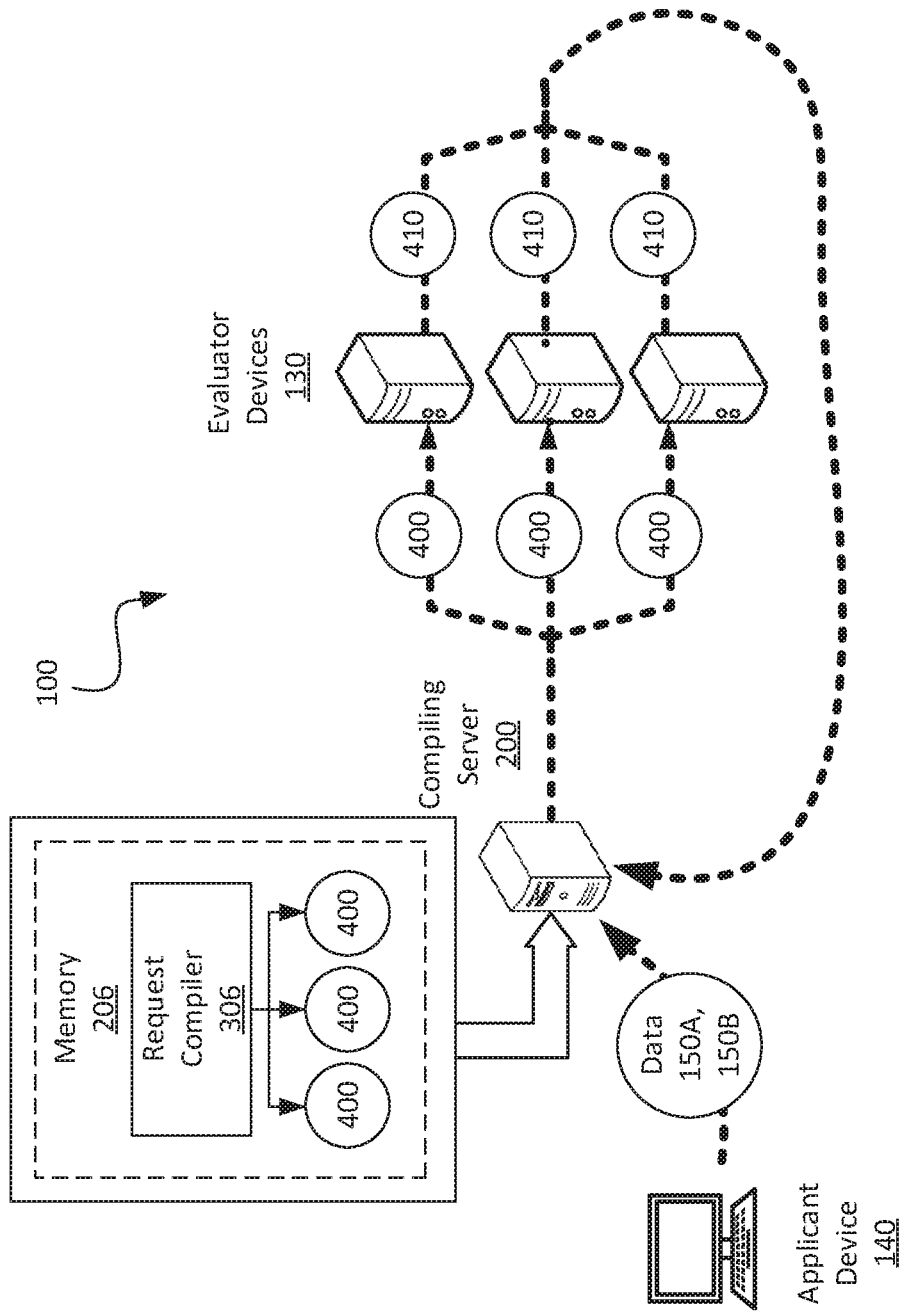
FIG. 6 is a schematic diagram of the system of FIG. 1 showing the compiling server compiling and transmitting requests from a multi-request application.
Figure 7:
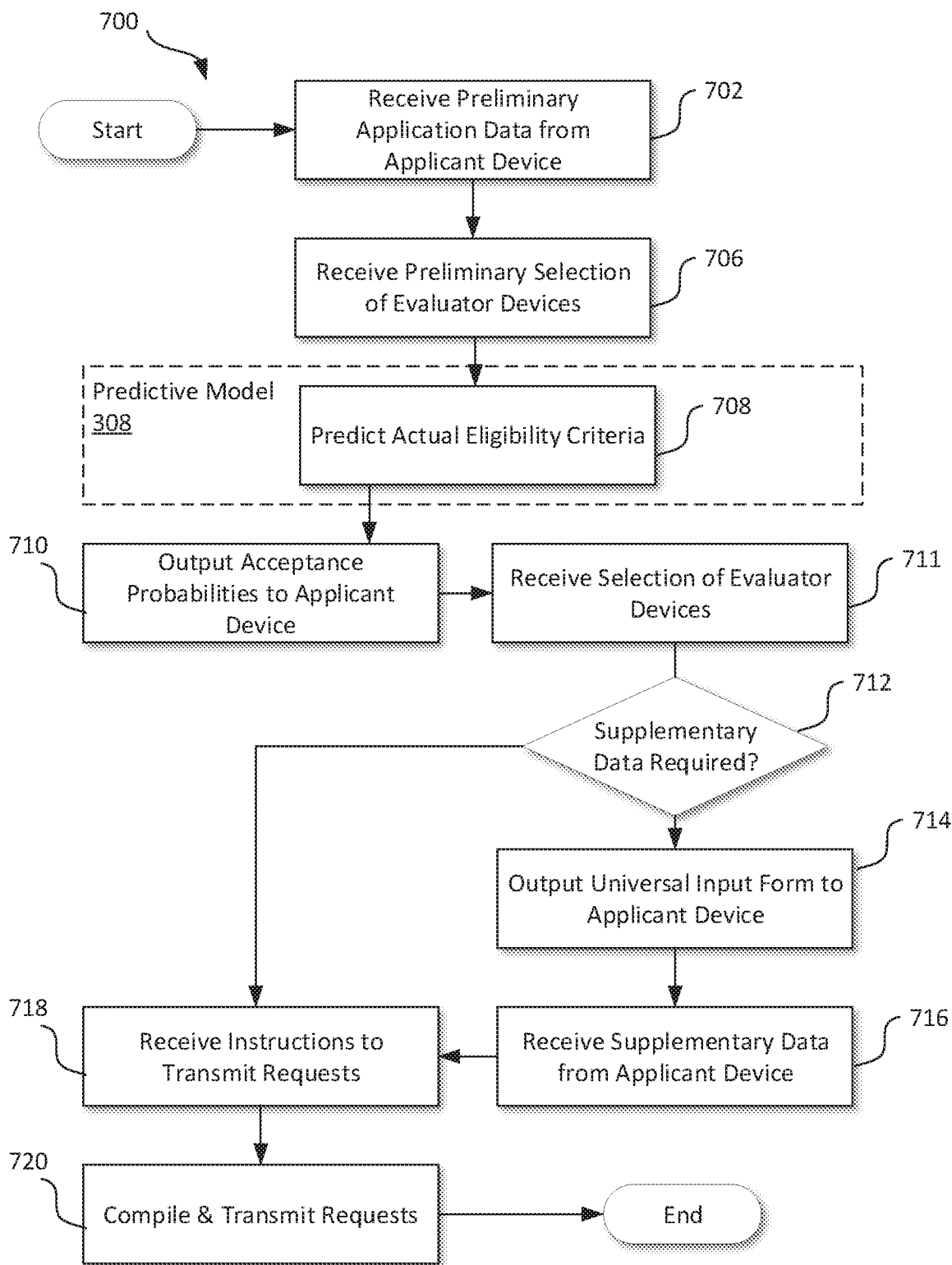
FIG. 7 is a flowchart showing a method for processing a multi-request application.

FIG. 6 is a schematic diagram of the system 100 showing the compiling server 200 compiling and transmitting requests 400 from a multi-request application, according to a non-limiting embodiment, with network 110, third party systems 120, and monitoring device 125 omitted for brevity. FIG. 7 is a flowchart showing a method 700 for processing a multi-request application, according to a non-limiting embodiment, which may be consulted with continued reference to FIG. 6. It is to be emphasized, however, that the blocks of method 700 need not be performed in the exact sequence as shown. Further, the method 700 is described as performed by a system and device discussed herein, but this is not limiting and the method can alternatively be performed by other systems and/or devices. Further, while an example implementation to students making applications for admission to academic institutions is referenced by way of example, this is not limiting, and the method 700 can be applied to other computerized application processes.

At block 702, the compiling server 200 receives preliminary application data 150A from an applicant device 140 to be used in requests to at least one evaluator device 130. For example, the compiling server 200 may receive the grades, nationality, highest level of education obtained, country of education, primary language of instruction, cumulative grade point average (CGPA), most recent educational institution attended, graduate management admission test (GMAT) score, graduate record examinations (GRE) score, and language test scores, of a prospective student.

In some embodiments, portions of the preliminary application data 150A may be supplemented by third party systems 120. For example, an applicant's grades provided according to one grading scale may be converted by a third party system 120 into other grade scales required by the evaluator devices 130.

At block 706, the compiling server 200 receives a preliminary selection of evaluator devices 130 to which the applicant device 140 is making requests. For example, a preliminary selection of evaluator devices is determined based on a selected educational program and region of the world.

At block 708, the compiling server 200 predicts actual eligibility criteria for acceptance of requests by the evaluator devices 130 of the preliminary selection of evaluator devices 130, using predictive model 308. For example, predictive model 308 may determine that despite one academic institution stipulating that a CPGA of 3.8/4.0 is an admission requirement, the predictive model 308 may determine that in fact, based on recent application data contributed toward predictive model 308, a CPGA of 4.0/4.0 is a more accurate admission requirement. Other actual eligibility criteria may include particular language test results, visa requirements, or other requirements. The actual eligibility criteria may vary dynamically dependent on the preliminary application data 150A. For example, the predictive model 308 may recognize that the need for an English language certificate may be required for students from certain countries, but not from others.

In some embodiments, where one of the preliminary eligibility data and the supplementary data includes a written sample, the predictive model 308 may apply natural language processing techniques to predict the quality of the written sample with respect to obtaining acceptance of a request.

Additionally, as a consequence of predicting the actual eligibility criteria, the predictive model 308 may recommend additional actions which may be taken by the applicant to improve the applicant's chances of admission. For example, predictive model 308 may recognize that although submission of an essay is optional, given the applicant's preliminary application data 150A, the submission of an admissions essay may be highly beneficial to the applicant's chances of admission. Prompts for optionally beneficial data may be included into the universal input form at block 714 below. In some embodiments, improvements to an applicant's written sample may be recommended.

At block 710, probabilities of acceptance of requests are outputted to the applicant device 140 for each of the preliminarily selected evaluator devices 130. For example, some of the academic institutions may be likely to accept the applicant, whereas others are unlikely to accept the applicant, and may be excluded from display to the applicant device 140. In some embodiments, the multi-request application may display the most likely accepting academic institutions to the applicant. In some embodiments, the selection of evaluator devices 130 is received by first outputting a pool of likely-accepting evaluator devices 130 to the applicant device 140, where the likely-accepting evaluator devices 130 have a probability of acceptance greater than a pre-determined probability threshold.

At block 711, a selection of evaluator devices 130 is received by the compiling server 200. In some embodiments, lists of likely accepting academic institutions, and likely accepting academic programs offered by those schools, may be filtered at the applicant device 140 by the applicant by geographic location, school type, tuition fee, average cost of living near the school, or other criteria. Program descriptions may be displayed, and may be categorized according to similarity of program description. In some embodiments, machine learning may be used to categorize academic programs based on similar subject matter, despite, for example, being offered through different faculties of education within a given academic institution.

At block 712, based on the selection of evaluator devices 130, and where the selected evaluator devices 130 require supplementary data 150B, block 714 is executed. For example, where a personal statement, essay, selection of courses and alternative programs, are required, a universal input form for obtaining these supplementary data 150B may be generated and outputted to the applicant device 140. Where no supplementary data 150B is required, where the preliminary application data 150A is sufficient to generate an application to the selected academic institutions, block 718 is executed At block 714, a universal input form is outputted to the applicant device 140. The universal input form is generated according to the supplementary data 150B required. The universal input form is generated such that a common core of supplementary data 150B required by each selected evaluator device 130, in addition to any additional requirements of each evaluator device 130, is obtained via a single input form, avoids duplication of data storage, data transmission, and effort on the part of the applicant. At block 716, the supplementary data 150B is inputted through the universal input form, and received at the compiling server 200. In some embodiments, the compiling server 200 can verify the authenticity, or merely the inclusion, of the supplementary data 150B for acceptance by the evaluator devices 130. Where verification of the supplementary data 150B cannot be provided, the applicant may be informed, for example by email, to upload the required supplementary data 150B.

The universal input form may also include prompts for the applicant to provide additional optional data which may improve the applicant's likelihood of admission, as recommended by predictive model 308.

At block 718, confirmed instructions to submit requests to the selected evaluator devices 130 are received at the compiling server 200.

At block 720, the separate requests to evaluator devices 130 are compiled, and each is transmitted to the appropriate evaluator device 130. The compiled requests are generated by extracting from preliminary application data 150A and supplementary data 150B only the information required by each respective academic institution. In some embodiments, the preliminary application data 150A and supplementary data 150B, as appropriate, may be transmitted through an academic institutions application programming interface (API) or other computerized communication platform.

In some embodiments, compiling the requests involves normalizing portions of the preliminary eligibility data according to the eligibility evaluation requirements of each of the evaluator devices 130 of the selection of evaluator devices. For example, the compiling server 200 may automatically conform a student's grades for evaluation by an academic institution operating under a particular grading scheme, by referencing a grade converted system of third party systems 120.

Thus, a prospective student making several applications for admission to several academic institutions may complete a single multi-request application for the collection of all data and documentary requirements.

Figure 8:
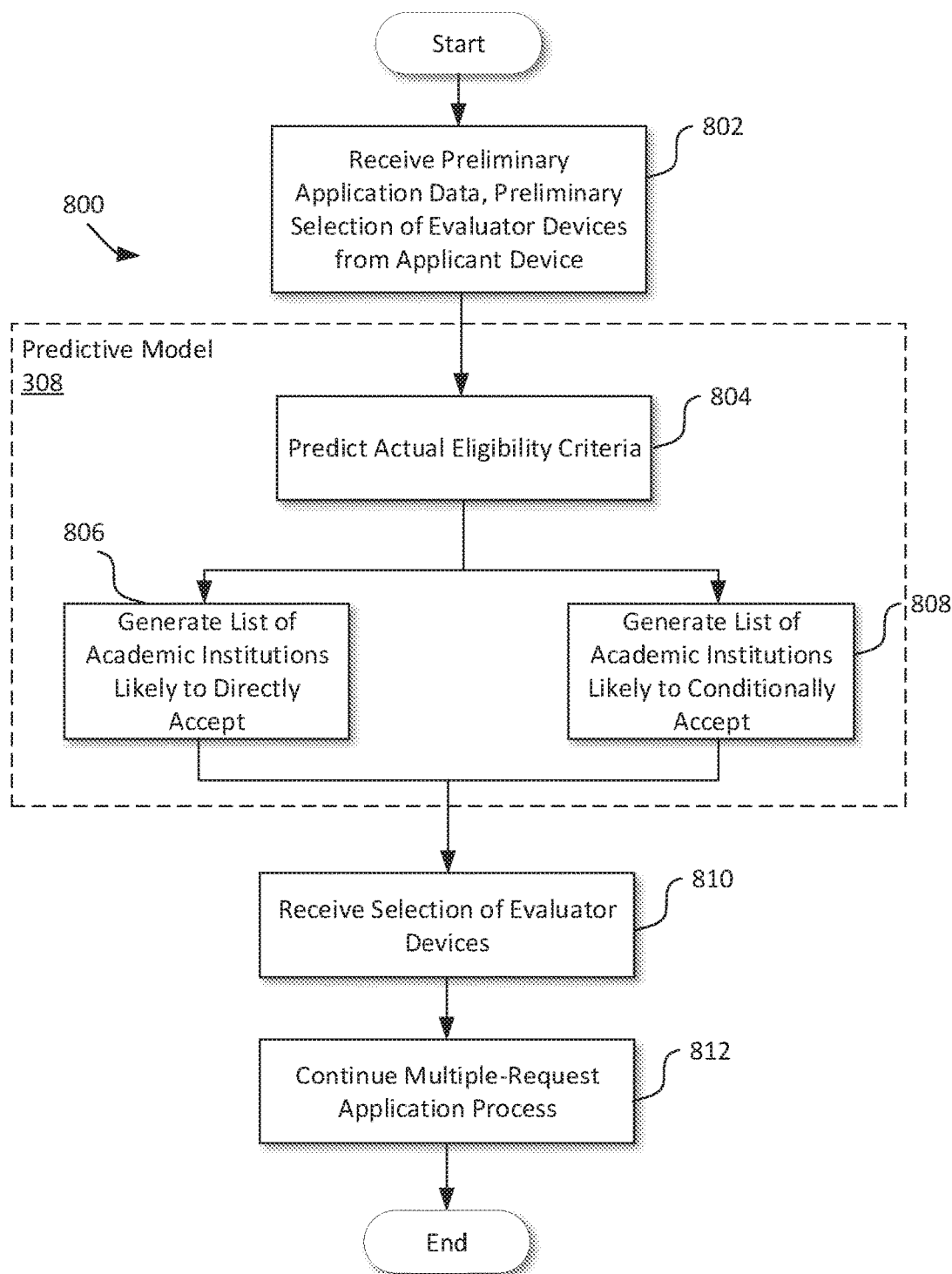
FIG. 8 is a flowchart showing a method for generating a selection of academic institutions.

FIG. 8 is a flowchart showing a method 800 for generating a selection of academic institutions, according to a non-limiting embodiment. The method 800 is applicable to the implementation of a student applying for admission to academic institutions, where some of the academic institutions allow for conditional acceptance. It is to be emphasized, however, that the blocks of method 800 need not be performed in the exact sequence as shown. Further, the method 800 is described as performed by a system and device discussed herein, but this is not limiting and the method can alternatively be performed by other systems and/or devices.

At block 802, preliminary application data and a preliminary selection of evaluator devices 130 is received from an applicant device 140, analogous to block 706 of method 700.

At block 804, actual eligibility criteria for acceptance of requests by the preliminarily selected evaluator devices 130 is determined by the predictive model 308, analogous to block 708 of method 700. However, furthermore, at block 806, a list of academic solutions likely to directly accept the applicant is generated, and at block 808 a list of academic solutions likely to conditionally accept the applicant is generated, using the predictive model 308. Many academic institutions offer conditional acceptance of applicants based on preliminary applicant data, such as grades, and commit to offering admission to the applicant provided the applicant fulfill various follow-up actions to satisfy conditional acceptance criteria. However, by contributing past application data to predictive model 308, predictive model 308 is trained to predict direct acceptance versus conditional acceptance, and the conditional requirements associated with conditional acceptance. The respective lists of academic institutions may be displayed or categorized differently at the applicant device 140.

At block 810, a selection of evaluator devices 130, based on the academic institutions likely to directly accept the applicant, and the academic institutions likely to conditionally accept the applicant, is received by the compiling server 200.

Having determined a selection of evaluator devices, a multi-request application process can continue at block 812. For example, the remaining blocks of method 700 after block 711 may be executed.

Figure 9:
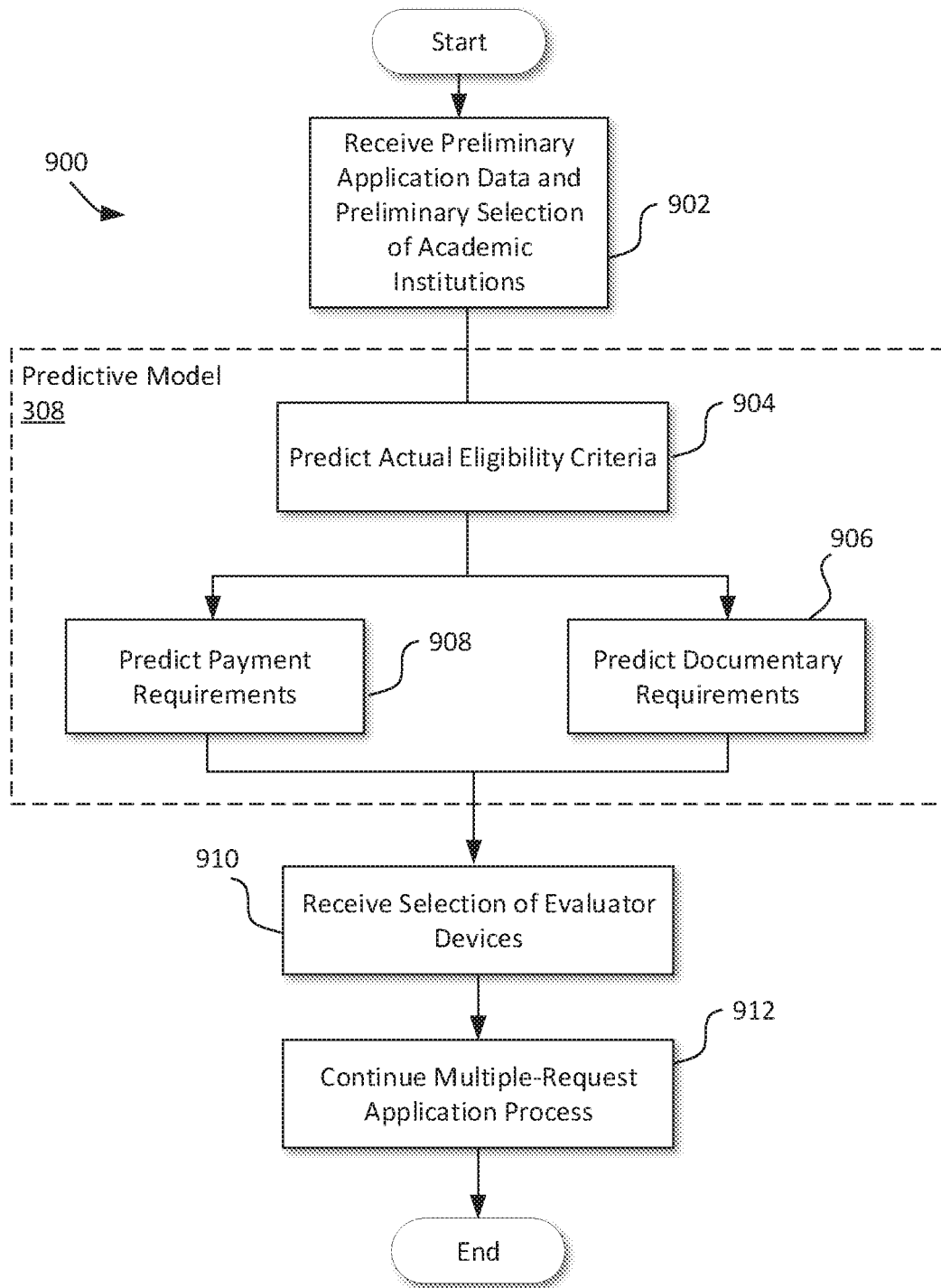
FIG. 9 is a flowchart showing a method for compiling admission requests for filing at a selection of academic institutions.

FIG. 9 is a flowchart showing a method 900 for compiling admission requests for filing at a selection of academic institutions, according to a non-limiting embodiment. The method 900 is applicable to the implementation of a student applying for admission to academic institutions, where the academic institutions have different payment and documentary requirements. It is to be emphasized, however, that the blocks of method 900 need not be performed in the exact sequence as shown. Further, the method 900 is described as performed by a system and device discussed herein, but this is not limiting and the method can alternatively be performed by other systems and/or devices.

At block 902, preliminary application data and a preliminary selection of evaluator devices 130 is received from an applicant device 140, analogous to block 802 of method 800.

At block 904, actual eligibility criteria for acceptance of requests by the preliminarily selected evaluator devices 130 is determined by the predictive model 308, analogous to block 804 of method 800. However, furthermore, at block 906, documentary requirements are predicted, and at block 908, payment requirements are predicted. Many academic institutions have particular payment requirements, some of which may vary depending on the preliminary application data 150A, such as the applicant's country of origin. However, by contributing past application data to predictive model 308, predictive model 308 is trained to predict payment and documentary requirements.

At block 910, a selection of evaluator devices 130 is received by the compiling server 200, analogous to block 711 of method 700.

Having determined a selection of evaluator devices, a multi-request application process can continue at block 912. For example, the remaining blocks of method 700 after block 711 may be executed. They payments and documents can be verified, e.g. analogous to block 716 of method 700, in consultation with various third party systems 120, such as payment converters and government offices.

FIG. 10 is a flowchart showing a method 1000 for processing admission requests for filing at academic institutions, according to a non-limiting embodiment. The method 1000 is applicable to the implementation of a student applying for admission to academic institutions, where an agent uses a monitoring device 125 to submit applications on behalf of several prospective students. Briefly, a compiling server 200 tracks each request and outputs statuses of the requests to the monitoring device 125, along with expected commission rates and other data via agent interface manager 310. It is to be emphasized, however, that the blocks of method 1000 need not be performed in the exact sequence as shown. Further, the method 1000 is described as performed by a system and device discussed herein, but this is not limiting and the method can alternatively be performed by other systems and/or devices.

At block 1002, an agent uses a monitoring device 125 to submit requests 400, in cooperation with compiling server 200, to evaluator devices 130. The submission process may proceed by way of any of methods 700, 800, or 900.

At block 1004, the agent interface manager 310 calculates in real-time the expected commission rate to be received by the agent if a request is accepted. A calculation may be made for each pending request being managed by the agent. Each academic institution may put in place with the agent its own contracts for directing successful applicants to the academic institution, the terms of which are stored in agent interface manager 310. The commission rate may depend on the applicant's application data 150, such as, for example, the applicant's country of origin, and the tuition fees to be paid by the applicant. The calculation of commission may take place in real-time, and may update as some of the students become accepted or drop out of the application process, or by other factors, such as currency exchange rates, which may be determined by currency converters of third party systems 120. Through monitoring device 125, an agent may view how much commission the agent may receive from each academic institution, or as a lump sum.

At block 1006, real-time pendency data may be calculated for each pending request. Pendency data can include the expected duration of pendency, or the expected date, by which an evaluation of a request may be expected to be received. Pendency data can also include the pendency of other third party applications, such as visa applications made by the applicant.

At block 1008, status of requests may be monitored, along with the status of associated commission data, pendency data, and other data, such as completion of the multi-request application by the applicant. While monitoring requests, an applicant may contact a student to remind the student of actions needed to take to complete the multi-request application, such as obtaining language certifications, granted visas, or other admission requirements.

At block 1010, where an academic institution accepts a student into an academic program, the compiling server 200 receives a notification confirming acceptance of the request. The compiling server 200 may in turn inform monitoring device 125, as well as the relevant applicant device 140, of the acceptance. Where acceptance is confirmed, such as by confirmed acceptance from the applicant, the agent may be paid the appropriate commission at block 1012. Payment may be send through compiling server 200 or through a third party system 120. Upon sending payment the agent using monitoring device 125 may be informed of the payment, such as, for example by email.

Thus, the compiling server 200 can integrate with monitoring device 125 to enable an agent to manage the applications of several prospective student clients, while leveraging the predictive capacity of the system to anticipate likelihood of admission, expected pendency of applications, and expected commission fees to be obtained by the agent.

FIG. 11 is a flowchart showing a method 1100 for fulfilling a request for a documentary requirement, according to a non-limiting embodiment. The method 1100 is applicable to the implementation of a student applying for admission to academic institutions, and where a student has been accepted into an academic institution is required to make an application to fulfill a documentary requirement, such as to obtain a student visa, to permit entrance into the country of an academic institution. It is to be emphasized, however, that the blocks of method 1000 need not be performed in the exact sequence as shown. Further, the method 1000 is described as performed by a system and device discussed herein, but this is not limiting and the method can alternatively be performed by other systems and/or devices.

At block 1102, the compiling server 200 receives an evaluation 410 accepting a request 400 from an evaluator device 130. The evaluation 410 includes requests for an additional documentary requirement before the student can be admitted into the academic institution.

At block 1104, the predictive model 308 predicts the likelihood that the student making an application for the documentary requirement, such as a student visa, will be successful in that application. At block 1106, the predictive model 308 recommends actions and/or steps to take when making the application for the documentary requirement to improve the student's chances of being successful, such as obtaining a police check, providing a statement of purpose, tuition fee payment, and other suggestions. The predictive model 308 is trained with library 208 including data relating to previous applications for the same and/or similar documentary requirements, including visa applications, and outcomes to such applications, in addition to the student's application data 150. The likelihood of acceptance and suggestions to improve chances of acceptance can be outputted to the application device 140 and/or monitoring device 125.

As discussed above, it is emphasized that the blocks of method 1100 need not be performed in the exact sequence as shown, and thus the likelihood of documentary requirement acceptance and/or suggestions to improve probability of documentary requirement acceptance may have been calculated previously, upon receiving an evaluation 410, or at another time.

At block 1108, where recommendations were made to improve the student's chances of success, the recommended data is received.

At block 1110, the recommended data, along with other data extracted compiled from application data 150, is compiled into an application to obtain the documentary requirement, such as a visa application, and the application is transmitted to the relevant institution. The application process may be managed and monitored by compiling server 200 and monitoring device 125 in a manner analogous to requests made to evaluator devices 130.

At block 1112, a result of making the documentary application is received.

At block 1114, where the documentary requirement application is not accepted, block 1106 may be executed, where additional recommendations to achieve a successful application may be made, and the documentary application may proceed again.

Thus, applications for additional documentary requirements which are ancillary to a request being accepted by an evaluator device 130 can be compiled, managed, and monitored.

The invention claimed is:

1. A system for processing a multi-request application for a plurality of academic institutions, the system comprising:
   an applicant device comprising a network interface and a processor in communication with the network interface, the processor of the applicant device being configured to receive application data to be used in requests made on behalf of an applicant to a selection of evaluator devices associated with the plurality of academic institutions, wherein the application data comprises preliminary eligibility data, the preliminary eligibility data comprises academic grades, and wherein at least one evaluator device of the selection of evaluator devices associated with the plurality of academic institutions has acceptance criteria against which the preliminary eligibility data is compared to determine acceptance or denial of a request made to the evaluator device; and
   a multi-request compiling server comprising:
      a network interface in communication with the selection of evaluator devices associated with the plurality of academic institutions and the applicant device via a computer network;
      a memory for storing programming instructions and a library of application data; and
      a processor in communication with the network interface and the memory, the processor of the compiling server being configured to:
         receive the application data and the selection of evaluator devices associated with the plurality of academic institutions from the applicant device;
         predict, using a predictive model, actual eligibility criteria for acceptance of a request by at least one of the evaluator devices of the selection of evaluator devices associated with the plurality of academic institutions by inputting the preliminary eligibility data into the predictive model trained with the library of application data to predict actual eligibility criteria required by evaluator devices to accept requests, the library of application data including previously evaluated requests and outcomes to said previously evaluated requests;
         normalize the academic grades according to eligibility evaluation requirements of a particular evaluator device associated with a particular academic institution of the selection of evaluator devices associated with the plurality of academic institutions to provide normalized academic grades;

generate, using the predictive model, an acceptance prediction for a request to be made on behalf of the applicant, the acceptance prediction being based on the application data, the normalized academic grades, and the actual eligibility criteria for the at least one evaluator device of the selection of evaluator devices associated with the plurality of academic institutions;

determine, using the predictive model, whether the acceptance prediction for the request to be made on behalf of the applicant can be improved with provision of supplementary data;

in response to determining that the acceptance prediction can be improved with the provision of supplementary data, request and receive the supplementary data from the applicant device; and compile the normalized academic grades, the preliminary eligibility data and the supplementary data into separate requests for each evaluator device of the selection of evaluator devices associated with the plurality of academic institutions according to the actual eligibility criteria of the evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization.

2. The system of claim 1, wherein the processor of the compiling server is further configured to:

receive a preliminary selection of evaluator devices from the applicant device;

generate acceptance probabilities of requests from the applicant device to at least one evaluator device of the preliminary selection of evaluator devices associated with the plurality of academic institutions by inputting the preliminary eligibility data into the predictive model; and output the acceptance probabilities to the applicant device.

3. The system of claim 2, wherein the processor of the compiling server is configured to receive the selection of evaluator devices associated with the plurality of academic institutions by:

outputting a pool of likely-accepting evaluator devices to the applicant device, the pool of likely-accepting evaluator devices comprising evaluator devices of the preliminary selection of evaluator devices having acceptance probabilities beyond a probability threshold; and receiving the selection of evaluator devices associated with the plurality of academic institutions as a selection of evaluator devices from the pool of likely-accepting evaluator devices.

4. The system of claim 1, wherein one of the preliminary eligibility data and the supplementary data includes a written sample, and wherein the processor is further configured to apply natural language processing techniques in conjunction with the predictive model to predict quality of the written sample with respect to obtaining acceptance of a request.

5. The system of claim 1, wherein the system further comprises a monitoring device comprising a network interface, a processor in communication with the network interface, and a display interface in communication with the processor, the network interface of the monitoring device being in communication with the applicant device, the selection of evaluator devices associated with the plurality of academic institutions, and the multi-request compiling server via the computer network, and wherein the monitoring device is configured to display, via the display interface, statuses of requests submitted on behalf of the applicant to the selection of evaluator devices associated with the plurality of academic institutions.

6. The system of claim 5, wherein the monitoring device is further configured to display, via the display interface, an expected pendency duration of a request submitted on behalf of the applicant to an evaluator device of the selection of evaluator devices associated with the plurality of academic institutions.

7. The system of claim 6, wherein the monitoring device is further configured to display, via the display interface, an expected commission rate to be obtained upon acceptance of a request submitted on behalf of the applicant to an evaluator device of the selection of evaluator devices associated with the plurality of academic institutions.

8. A server comprising:

a network interface in communication with evaluator devices and an applicant device via a computer network;

a memory for storing programming instructions and a library of application data; and a processor in communication with the network interface and the memory, the processor configured to:

receive application data and a selection of evaluator devices associated with a plurality of academic institutions from the applicant device, the application data to be used in requests made on behalf of an applicant to the selection of evaluator devices associated with the plurality of academic institutions, wherein the application data comprises preliminary eligibility data, the preliminary eligibility data comprises academic grades, and wherein at least one evaluator device of the selection of evaluator devices associated with the plurality of academic institutions has acceptance criteria against which the preliminary eligibility data is compared to determine acceptance or denial of a request made to the evaluator device;

predict, using a predictive model, actual eligibility criteria for acceptance of a request by at least one of the evaluator devices of the selection of evaluator devices associated with the plurality of academic institutions by inputting the preliminary eligibility data into the predictive model trained with the library of application data to predict actual eligibility criteria required by evaluator devices to accept requests, the library of application data including previously evaluated requests and outcomes to said previously evaluated requests;

normalize the academic grades according to eligibility evaluation requirements of a particular evaluator device associated with a particular academic institution of the selection of evaluator devices associated with the plurality of academic institutions to provide normalized academic grades;

generate, using the predictive model, an acceptance prediction for a request to be made on behalf of the applicant, the acceptance prediction being based on the application data, the normalized academic grades, and the actual eligibility criteria for the at least one evaluator device of the selection of evaluator devices associated with the plurality of academic institutions;

determine, using the predictive model, whether the acceptance prediction for the request to be made on behalf of the applicant can be improved with provision of supplementary data;

in response to determining that the acceptance prediction can be improved with the provision of supplementary data, request and receive the supplementary data from the applicant device; and compile the normalized academic grades, the preliminary eligibility data and the supplementary data into separate requests for each evaluator device of the selection of evaluator devices associated with the plurality of academic institutions according to the actual eligibility criteria of the evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization.

9. The server of claim 8, wherein one of the preliminary eligibility data and the supplementary data includes a written sample, and wherein the processor is further configured to apply natural language processing techniques in conjunction with the predictive model to predict quality of the written sample with respect to obtaining acceptance of a request.

10. A method for compiling a request from a multi-request application for a plurality of academic institutions, the method comprising:

receiving application data and a selection of evaluator devices associated with the plurality of academic institutions from an applicant device, the application data to be used in requests made on behalf of an applicant to the selection of evaluator devices associated with the plurality of academic institutions, wherein the application data comprises preliminary eligibility data, the preliminary eligibility data comprises academic grades, and wherein at least one evaluator device of the selection of evaluator devices associated with the plurality of academic institutions has acceptance criteria against which the preliminary eligibility data is compared to determine acceptance or denial of a request made to the evaluator device;

using a predictive model to predict actual eligibility criteria for acceptance of a request by the at least one of the evaluator devices of the selection of evaluator devices associated with the plurality of academic institutions by inputting the preliminary eligibility data into the predictive model trained with a library of application data to predict actual eligibility criteria required by evaluator devices to accept requests, the library of application data including previously evaluated requests and outcomes to said previously evaluated requests;

normalizing the academic grades according to eligibility evaluation requirements of a particular evaluator device associated with a particular academic institution of the selection of evaluator devices associated with the plurality of academic institutions to provide normalized academic grades;

using the predictive model to generate an acceptance prediction for a request to be made on behalf of the applicant, the acceptance prediction being based on the application data, the normalized academic grades, and the actual eligibility criteria for the at least one evaluator device of the selection of evaluator devices associated with the plurality of academic institutions;

using the predictive model to determine whether the acceptance prediction for the request to be made on behalf of the applicant can be improved with provision of supplementary data;

in response to determining that the acceptance prediction can be improved with the provision of supplementary data, requesting and receiving the supplementary data from the applicant device; and compiling the normalized academic grades, the preliminary eligibility data and the supplementary data into separate requests for each of the evaluator devices of the selection of evaluator devices associated with the plurality of academic institutions according to the actual eligibility criteria of the evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization.

11. The method of claim 10, wherein the method further comprises:

receiving a preliminary selection of evaluator devices from the applicant device;

generating acceptance probabilities of requests from the applicant device to at least one evaluator device of the preliminary selection of evaluator devices associated with the plurality of academic institutions by inputting the preliminary eligibility data into the predictive model; and outputting the acceptance probabilities to the applicant device.

12. The method of claim 11, wherein the receiving the selection of evaluator devices associated with the plurality of academic institutions comprises:

outputting a pool of likely-accepting evaluator devices to the applicant device, the pool of likely-accepting evaluator devices comprising evaluator devices of the preliminary selection of evaluator devices having acceptance probabilities beyond a probability threshold; and receiving the selection of evaluator devices associated with the plurality of academic institutions as a selection of evaluator devices from the pool of likely-accepting evaluator devices.

13. The method of claim 12, wherein one of the preliminary eligibility data and the supplementary data includes a written sample, and wherein the method further comprises applying natural language processing techniques in conjunction with the predictive model to predict quality of the written sample with respect to obtaining acceptance of a request.

14. The method of claim 10, wherein the method further comprises displaying, at a monitoring device, statuses of requests submitted on behalf of the applicant to the selection of evaluator devices associated with the plurality of academic institutions.

15. The method of claim 14, wherein the method further comprises:

displaying, at the monitoring device, an expected pendency duration of a request submitted on behalf of the applicant to an evaluator device of the selection of evaluator devices associated with the plurality of academic institutions.

16. The method of claim 14, wherein the method further comprises:
displaying, at the monitoring device, an expected commission rate to be obtained upon acceptance of a request submitted on behalf of the applicant to an evaluator device of the selection of evaluator devices associated with the plurality of academic institutions.

\* \* \* \* \*

UNITED STATES PATENT AND TRADEMARK OFFICE
CERTIFICATE OF CORRECTION

PATENT NO. : 11,188,836 B2
APPLICATION NO. : 15/907650
DATED : November 30, 2021
INVENTOR(S) : Martin Basiri et al.

It is certified that error appears in the above-identified patent and that said Letters Patent is hereby corrected as shown below:

In the Claims

In Claim 1, Column 15, Lines 28-36:
Change "evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization."

To:
-- evaluator device. --

In Claim 2, Column 15, Lines 39-40:
Change "receive a preliminary selection of evaluator devices from the applicant device;"

To:
-- receive a preliminary selection of evaluator devices associated with the plurality of academic institutions from the applicant device; --

In Claim 8, Column 17, Lines 19-27:
Change "actual eligibility criteria of the evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization."

To:
-- actual eligibility criteria of the evaluator device. --

Signed and Sealed this
Twenty-fifth Day of April, 2023

*Katherine Kelly Vidal*
Katherine Kelly Vidal
*Director of the United States Patent and Trademark Office*

CERTIFICATE OF CORRECTION (continued)
U.S. Pat. No. 11,188,836 B2

In Claim 10, Column 18, Lines 21-29:
Change "actual eligibility criteria of the evaluator device, the separate requests comprising at least a first request and a second request, the first request being for the particular evaluator device and comprising the normalized academic grades, the second request being for another evaluator device of the selection of evaluator devices associated with the plurality of academic institutions and comprising the academic grades without normalization."

To:
-- actual eligibility criteria of the evaluator device. --

In Claim 11, Column 18, Lines 32-33:
Change "receive a preliminary selection of evaluator devices from the applicant device;"

To:
-- receive a preliminary selection of evaluator devices associated with the plurality of academic institutions from the applicant device; --